(12) United States Patent
Lebedev et al.

(10) Patent No.: US 10,801,662 B2
(45) Date of Patent: Oct. 13, 2020

(54) HOLDER FOR HARD-WIRED TABLET/SMARTPHONE AS EQUIPMENT CONSOLE

(71) Applicant: Illinois Tool Works Inc., Glenview, IL (US)

(72) Inventors: N. Lebedev, Bangalore (IN); Vishal Raina, Tumkur (IN); Somayya Ammanagi, Bangalore (IN); Sunder Ramasubbu, Bangalore (IN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/311,841

(22) PCT Filed: Jun. 23, 2017

(86) PCT No.: PCT/IB2017/053752
§ 371 (c)(1),
(2) Date: Dec. 20, 2018

(87) PCT Pub. No.: WO2018/002785
PCT Pub. Date: Jan. 4, 2018

(65) Prior Publication Data
US 2019/0203879 A1    Jul. 4, 2019

(30) Foreign Application Priority Data
Jun. 30, 2016   (IN) .............................. 201641022491

(51) Int. Cl.
*F16M 13/02*   (2006.01)
*G06F 1/16*    (2006.01)
(Continued)

(52) U.S. Cl.
CPC ........... *F16M 13/022* (2013.01); *A47B 23/02* (2013.01); *E05B 73/0082* (2013.01);
(Continued)

(58) Field of Classification Search
USPC ......................................................... 248/451
See application file for complete search history.

(56) References Cited

U.S. PATENT DOCUMENTS 6,478,276 B1 * 11/2002 Louh ................... B60R 11/0241
                                                          248/309.1
8,136,780 B2 * 3/2012 Lin ........................ F16M 11/28
                                                          248/316.4
(Continued)

FOREIGN PATENT DOCUMENTS

CN         2837923       11/2006
CN       203974701       12/2014
(Continued)

OTHER PUBLICATIONS

Int'l Search Report and Written Opinion Appln. No. PCT/IB2017/053752 dated Feb. 11, 2017 (8 pgs).

*Primary Examiner* — Monica E Millner
(74) *Attorney, Agent, or Firm* — McAndrews, Held & Malloy, Ltd.

(57) ABSTRACT

A holder for hard-wired tablet/smartphone as equipment console is provided. The holder provides (a) 6 degrees of freedom (3 translational and 3 rotational) adjustments for locking the tablet/smartphone position and orientation; (b) provision for emergency-stop and or any other important hardwired button such Has RESET, ON/OFF, etc; (c) concealed cabling for tablet/smartphone charger and E-stop and or any other important hardwired button such as RESET, ON/OFF, jog-wheel arrangement etc; (d) swivel corners matching edges of the various tablet/smartphone sizes; and (e) provision for jog-wheel or thumb-wheel arrangement for actuator or cross-head movement.

1 Claim, 7 Drawing Sheets

(51) Int. Cl.
   *F16M 11/04*   (2006.01)
   *F16M 11/06*   (2006.01)
   *E05B 73/00*   (2006.01)
   *F16M 11/24*   (2006.01)
   *A47B 23/02*   (2006.01)

(52) U.S. Cl.
   CPC ........... *F16M 11/041* (2013.01); *F16M 11/06* (2013.01); *F16M 11/24* (2013.01); *F16M 13/02* (2013.01); *G06F 1/1626* (2013.01); *G06F 1/1632* (2013.01); *F16M 2200/021* (2013.01); *F16M 2200/025* (2013.01)

(56) References Cited

U.S. PATENT DOCUMENTS

| | | | | |
|---|---|---|---|---|
| 8,235,334 | B1 * | 8/2012 | Kobal | F16M 11/041 248/122.1 |
| 8,413,943 | B1 * | 4/2013 | Li | F16M 11/041 248/292.12 |
| 8,469,325 | B2 * | 6/2013 | Yu | G10G 5/005 248/231.51 |
| 9,032,766 | B2 * | 5/2015 | Su | E05B 73/0082 70/14 |
| 9,285,832 | B2 * | 3/2016 | Galant | F16M 11/105 |
| 9,420,712 | B2 * | 8/2016 | Yang | F16M 11/041 |
| 9,476,439 | B1 * | 10/2016 | Liao | F16B 2/12 |
| 9,581,291 | B2 * | 2/2017 | Trotsky | F16M 11/041 |
| 9,890,899 | B2 * | 2/2018 | Theis | F16M 11/041 |
| 2008/0169393 | A1 * | 7/2008 | Wang | B60R 11/02 248/274.1 |
| 2010/0079285 | A1 * | 4/2010 | Fawcett | E05B 73/0005 340/568.1 |
| 2012/0234055 | A1 * | 9/2012 | Bland, III | E05B 73/0082 70/15 |
| 2012/0241567 | A1 * | 9/2012 | Gillespie-Brown | B60R 11/00 248/122.1 |
| 2013/0026324 | A1 * | 1/2013 | Fischer | F16M 11/041 248/316.1 |
| 2013/0134284 | A1 | 5/2013 | Hu et al. | |
| 2014/0246551 | A1 * | 9/2014 | Springer | F16M 11/041 248/276.1 |
| 2015/0196140 | A1 * | 7/2015 | Lin | F16M 13/02 248/551 |
| 2015/0338982 | A1 * | 11/2015 | Dufva | G06F 3/023 345/168 |
| 2015/0359114 | A1 | 12/2015 | Yang | |
| 2017/0049251 | A1 * | 2/2017 | Gulick, Jr. | A47F 7/0246 |

FOREIGN PATENT DOCUMENTS

| | | |
|---|---|---|
| WO | 2013133461 | 9/2013 |
| WO | 2014160758 | 10/2014 |

* cited by examiner

HOLDER FOR HARD-WIRED TABLET/SMARTPHONE AS EQUIPMENT CONSOLE

FIELD OF THE INVENTION

This present embodiment relates to a hard-wired holder for a tablet/smartphone as a console for a material or structural test system, and more particularly relates to the holder for smartphone/tablets to conveniently mount phones/tablets.

BACKGROUND OF THE INVENTION

In this era of smartphones, we see the smartphones and tablets being used everywhere, every day and every time in day to day activities of our life. The smartphone/tablet is serving as all-in-one versatile device that caters various functions such as telephone, watch, radio, television, computer, controller etc. There is no end to the usage and application of this smartphone/tablet as it has now become a common device in the field of social media and communication, games/sports, entertainment and internet, and information industries.

Now it is finding its applications in various industries also for executing programmed or instantaneous operational instructions to the machineries that are used for testing, process control, assembly of system, quality control etc. As the application of this device gets extended, positioning and holding of it in the system for convenience of usage takes importance. FIG. 1 illustrates typical smartphone/tablet holders used for various applications. A vast variety of holders for smartphone/tablets for various applications exist (a few of which are shown in FIG. 1) but none of these is found to be convenient for mounting smartphones/tablets used in the field of test and measurements.

The current invention is about compact and ergonomic design of such holder for a smartphone/tablet that will be mounted on various equipment including servo controlled test systems for assisting the operator to carry out various operations like drive control: pneumatic/hydraulic/electric to power on/off the devices mounting the specimen: by grip control and positioning the actuator test control: applying desired loading sequences on the specimen measure responses: acquiring measured responses of the specimen to applied loads display: display of online process/control information in terms of digital meters or graphs processing of data and report generation print/email of the test report FIG. 2 illustrates another typical smartphone/tablet holder. The main features of the holder 200 as shown in FIG. 2 are rotatable and adjustable stand that facilitates the 360 degrees of freedom rotation. The components of the holder with 3-pin joints are mount holder (1 No.), connector (1 No.), stainless steel pole (1 No.), clip (1 No.), rotary knob (2 No.), nut (1 No.), and handle (1 No.). The drawbacks of this typical holder 200 are that it serves just as a tablet holder without any concealed cabling for power cable or charger and also, without any provision for additional device like (a) emergency-stop (E-stop) that is very much essential in instant switching off of the machine or equipment under control through tablet in the event of any malfunctioning in the system; and/or (b) any other important hardwired button such as RESET, ON/OFF, etc. The number of degrees of freedom of this holder 200 is limited to only 3 rotational degrees of freedom and also not a compact one. The gripping of the holder 200 acts on the middle of the edges of the tablet so not recommended for all tablets, because, some tablets may have tablet controls like power button, volume controls, display controls in the middle of the edges. The gripping support surface area is also small and hence not so safe for the bit heavier and larger tablets.

Accordingly, there is a need in that art to provide a solution to one or more of above said problems. The present embodiment overcomes many of these problems in a unique and economical manner.

OBJECTS OF THE INVENTION

The principle object of the present embodiment is to provide a holder for convenient mounting of a smartphone/tablet used in the field of test and measurements. The holder includes the provision for corner gripping, larger supporting gripping surface, concealed cabling for power supply/charger and additional E-Stop device and or any other important hardwired button such as RESET, ON/OFF, etc. The holder is also having provision to mount rotary encoder and its electronic hardware to facilitate actuator or cross-head movement through jog-wheel. The device is compact too with 6 degrees of freedom. (3 translational and 3 rotational) adjustment.

BRIEF DESCRIPTION OF DRAWINGS

The foregoing summary, as well as the following detailed description of preferred embodiments, is better understood when read in conjunction with the appended drawings. For the purpose of illustrating the invention, there it is shown in the drawings, for example, constructions of the invention. However, the invention is not limited to the specific systems and methods disclosed. In the drawings.

DETAILED DESCRIPTION OP PREFERRED EMBODIMENTS

The present embodiment will be described herein below, with reference to the accompanying drawings. A device/holder for hard-wired tablet/smartphone as an equipment console is described herein.

The following description is of exemplary embodiment of the invention only, and is not to the limited scope, applicability or configuration of the invention. Rather, the following description is intended to provide a convenient illustration for implementing various embodiments of the invention. As will become apparent, various changes may be made in the function and arrangement of the structural/operational features described in these embodiments without departing from the scope of the invention as set forth herein. It should be appreciated that the description herein may be adapted to be employed with alternatively configured devices having different shaped, components, and the like and still fall within the scope of the present invention. Thus, the detailed description herein is presented for purposes of illustration only and not of limitation.

Figure 1:
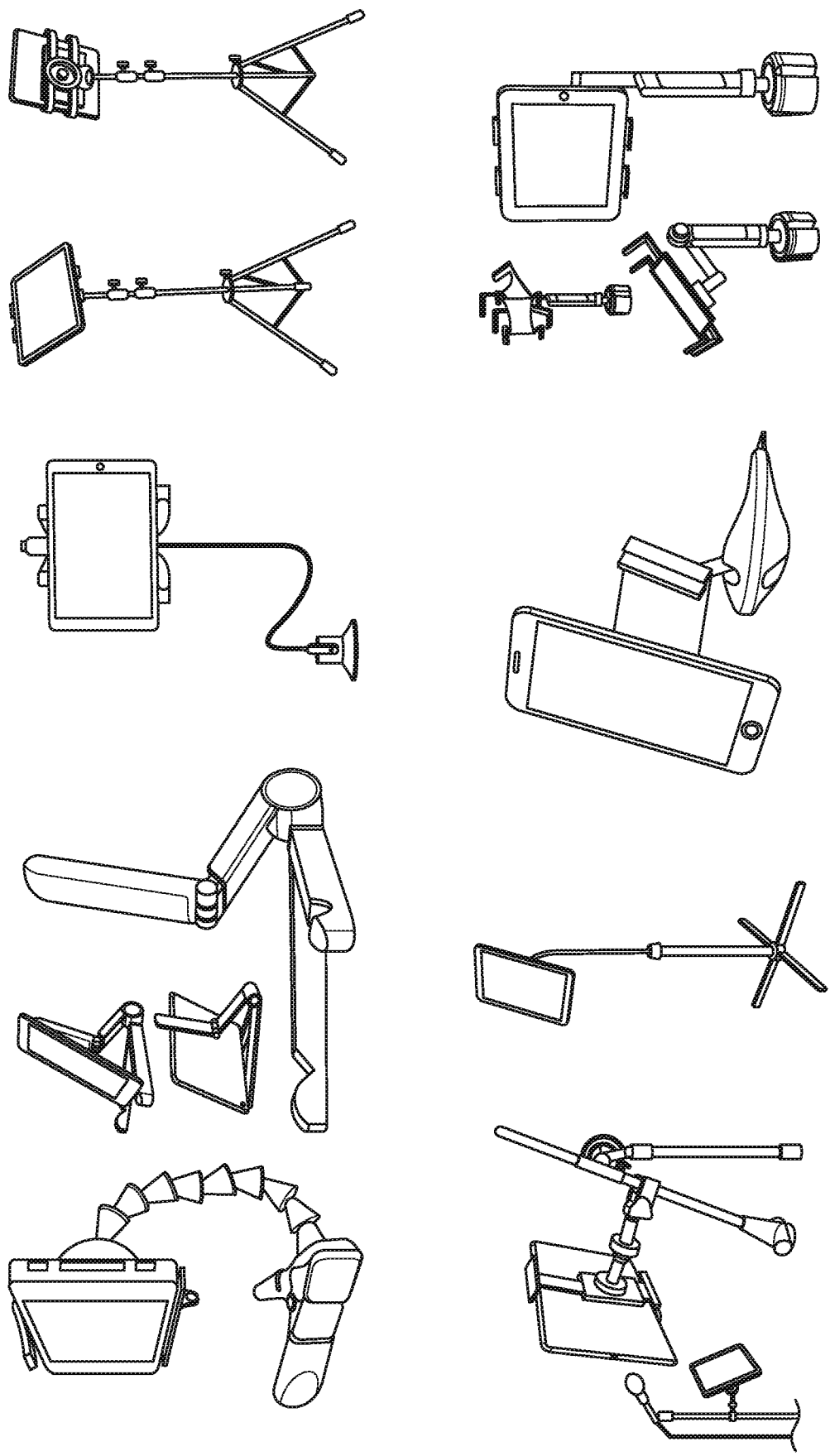
FIGS. 1 and 2 illustrate a typical smartphone/tablet holders used for various applications.
Figure 2:
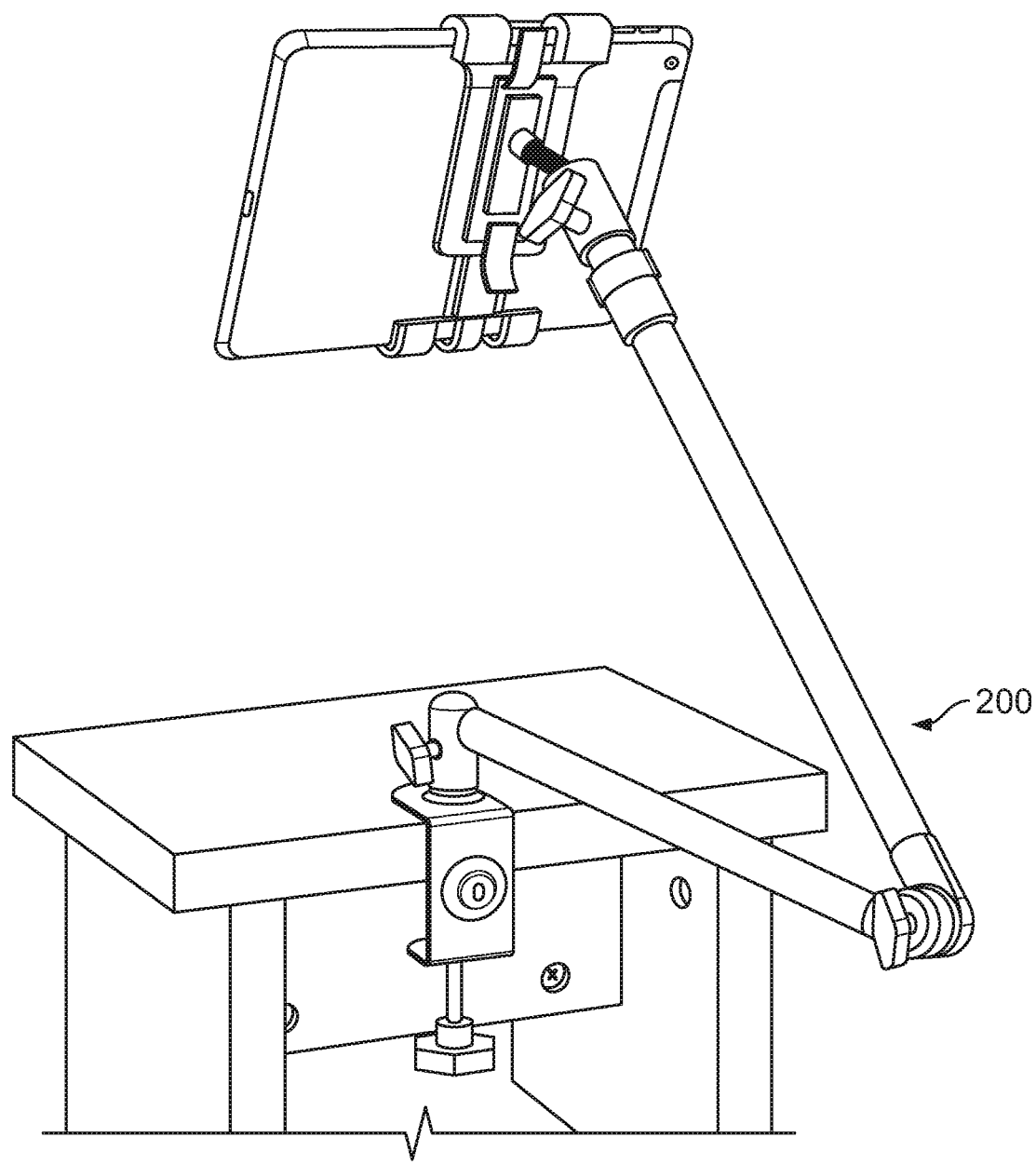
Figure 3A:
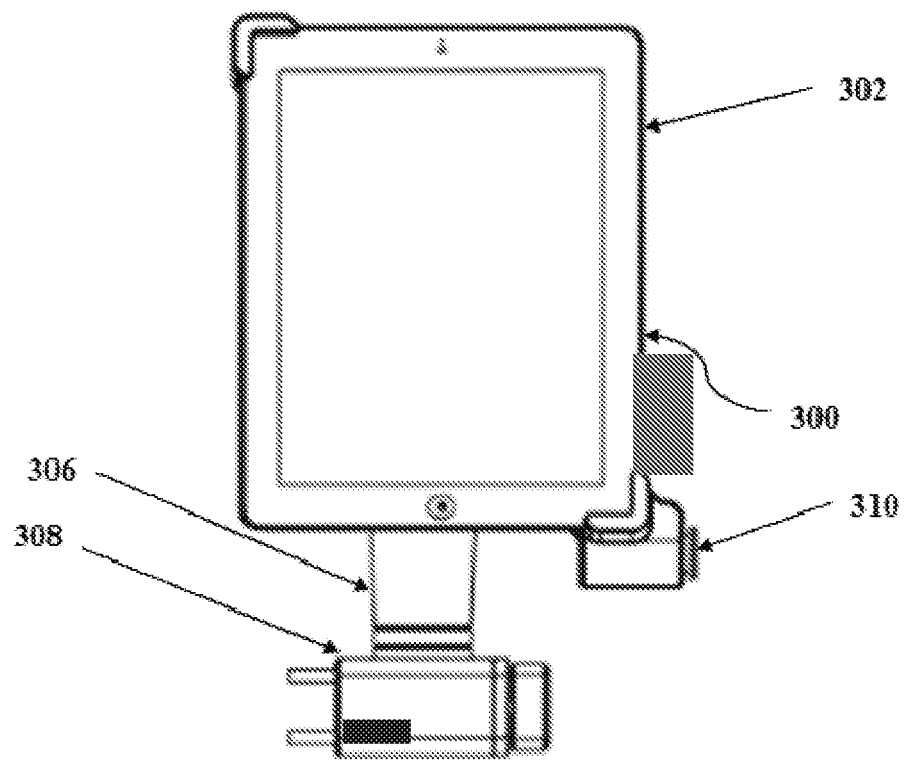
FIGS. 3A & 3B respectively illustrate front-view and rear-view of a smartphone/tablet holder with smartphone fitted therein in accordance to an embodiment herein.
Figure 3B:
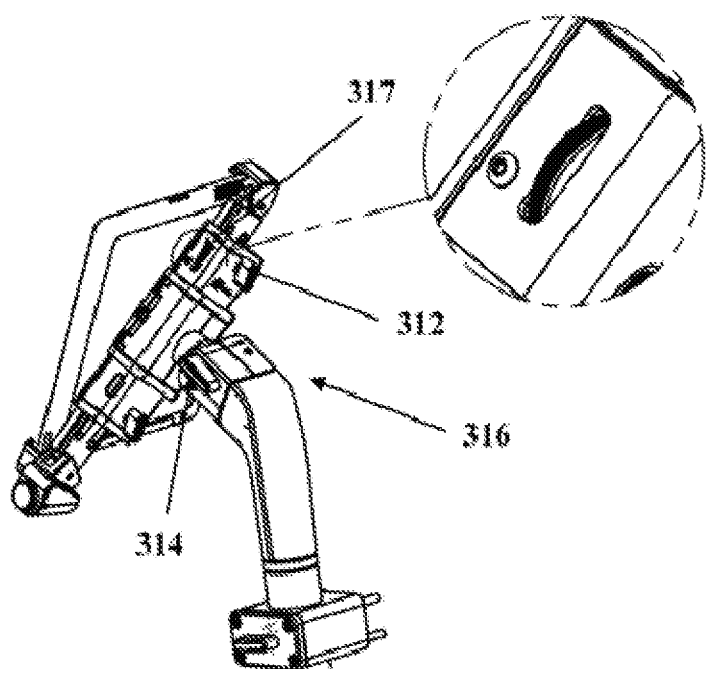

FIGS. 3A & 3B respectively illustrate front-view and rear-view of a smartphone/tablet holder 300 with a smartphone 302 fitted therein in accordance to an embodiment herein. The significant features of the smartphone/tablet holder 300 are: (a) the holder provides 6 degrees of freedom (3 translational and 3 rotational) adjustments for locking the tablet position and orientation; (b) provision for emergency-stop and/or any other important hardwired button such as RESET, ON/OFF etc.; (c) concealed cabling for tablet changer and E-stop and/or any other important hardwired button such as RESET, ON/OFF, jog-wheel etc; (d) swivel corners matching edges of the various tablet sizes; and (e) jog-wheel arrangement to facilitate actuator (325) or crosshead movement.

The components of the smartphone/tablet holder 300 are (1) E-stop and/or other switches 304; (2) tube (306) for height adjustment; (3) tablet holder mounting bracket (308); (4) lock (310) for height adjustment; (5) lock (312) for tablet grip; (6) lock (314) for tablet rotation 314; and (7) jog-wheel (thumb wheel) for positioning actuator or cross-head 317.

Figure 4A:
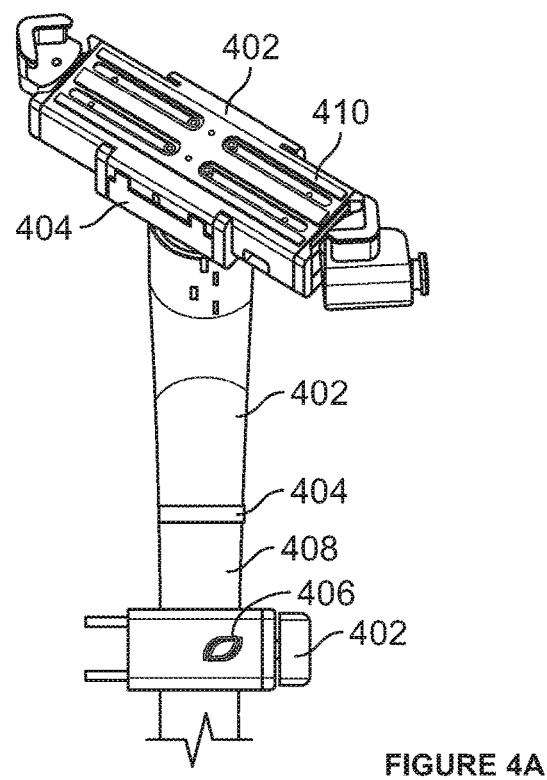
FIGS. 4A & 4B respectively illustrate front-view and other views (side-views and rear-view) of the smartphone/tablet holder as illustrated in FIG. 3 in accordance to the embodiment herein.
Figure 4B:
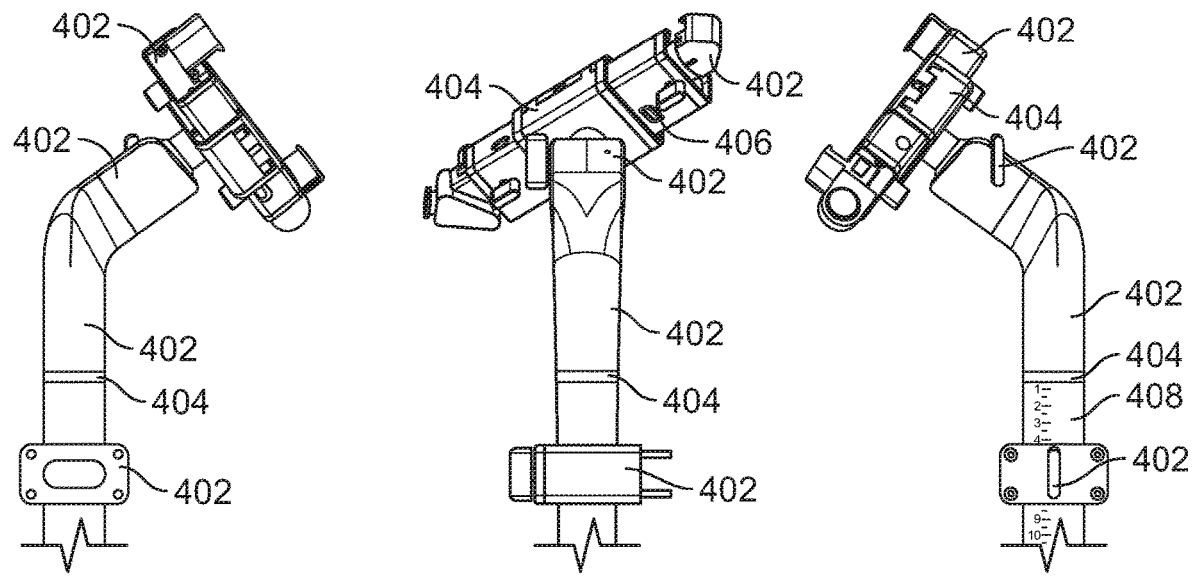

FIGS. 4A & 4B respectively illustrate front-view and other views (side-views and rear-view) of a smartphone/tablet holder 300 as shown in FIG. 3 in accordance to the embodiment herein. Moreover, these figures were provided as images to clearly indicate the color and outcome of the claimed invention.

The components/parts used in the smartphone/tablet holder (300) and the material as well as color used for making the parts are listed below: (i) various parts (402) made of aluminum and powder coated with matte black color finish (for example tablet holder or gripping part, vertical tube, knobs for locking the translational or angular positions of the holder), (ii) parts (404) made of pure colorless matte aluminum (for example plate holding upper and lower jaws of the tablet gripper), (iii) parts (406) that are having white colored etching (tablet holder bracket with logo); (iv) parts (408) with gray colored etching (for example scale on tube for vertical adjustment); (v) parts (410) made of rubber (for example rubber cushioning on gripping surface of the tablet).

Figure 5:
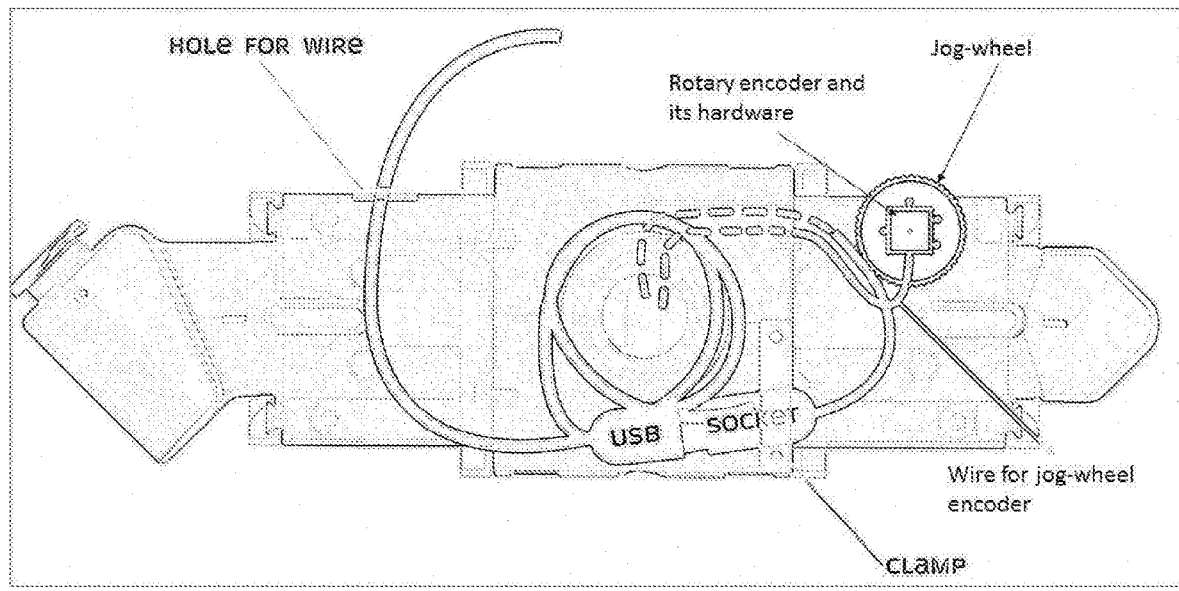
FIG. 5 illustrates a concealed cabling passage for a USB cable used for charging tablet and/or other cables in the smartphone/tablet holder as shown in FIG. 3 in accordance to the embodiment herein; this FIG. 5 also illustrates the mounting of jog-wheel arrangement and its concealed cabling.

FIG. 5 illustrates a concealed cabling passage for the USB cable 316 used for charging tablet and/or other cables in the smartphone/tablet holder 300. FIG. 5 also shows the mounting of jog-wheel arrangement which involves rotary encoder and its electronic hardware. The concealed cabling for this jog-wheel arrangement is also illustrated here.

Figure 6:
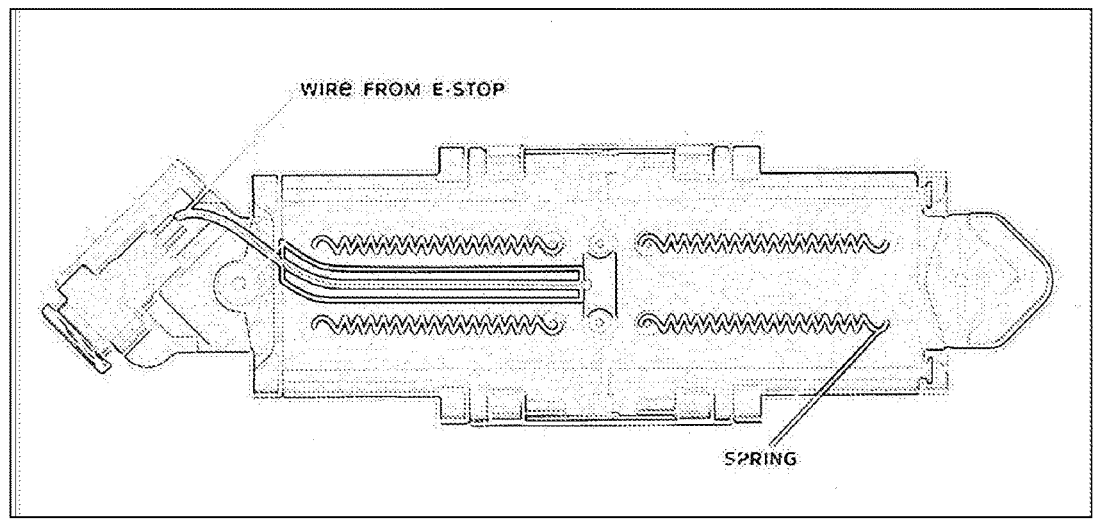
FIG. 6 illustrates a concealed cabling passage or E-stop and/or other switches in the smartphone/tablet holder as shown in FIG. 3 in accordance to the embodiment herein.

FIG. 6 illustrates a concealed cabling passage or the E-stop and/or other switches 304 in the smartphone/tablet holder 300.

Figure 7:
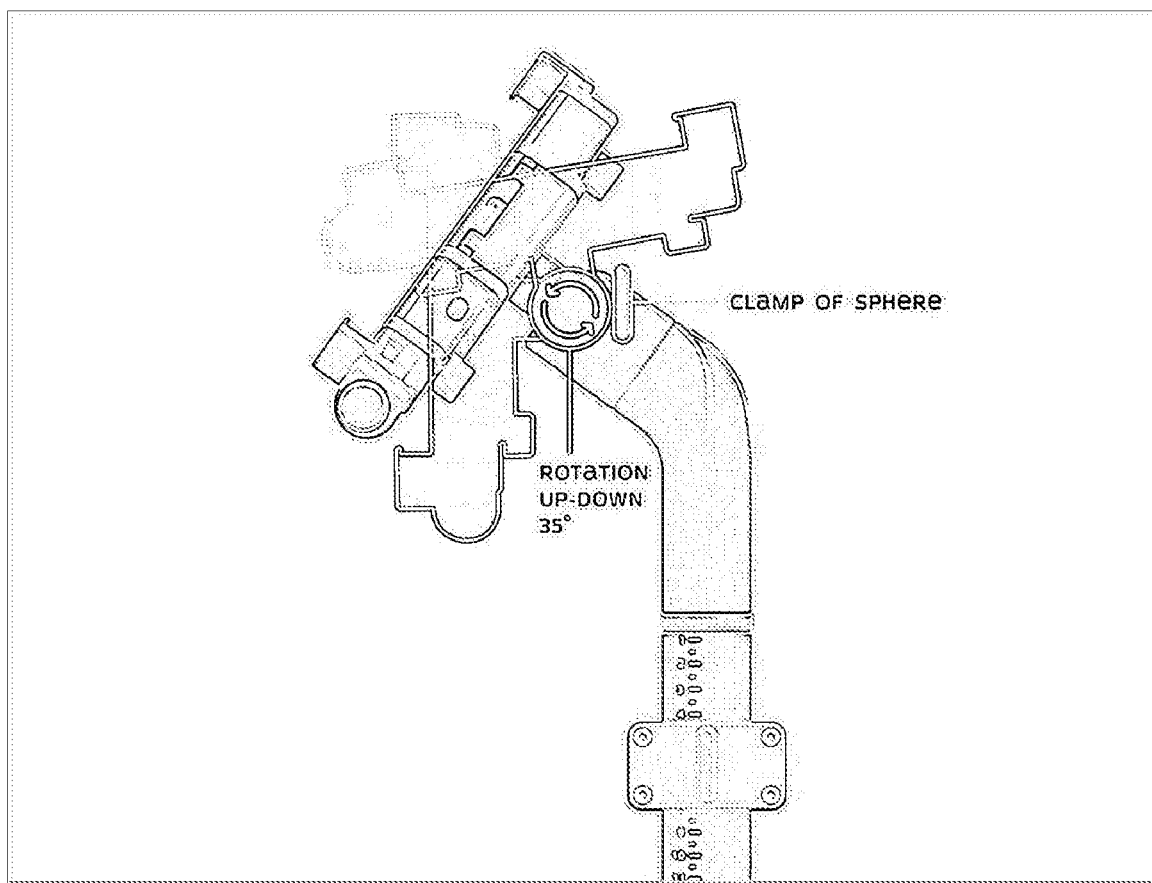
FIG. 7 illustrates an adjustment of angular orientation of a tablet gripper and locking it by a spherical clamp in the smartphone/tablet holder as shown in FIG. 3 in accordance to the embodiment herein.

FIG. 7 illustrates an adjustment of angular orientation of a tablet gripper and locking it by a spherical clamp in the smartphone/tablet holder 300.

Figure 8:
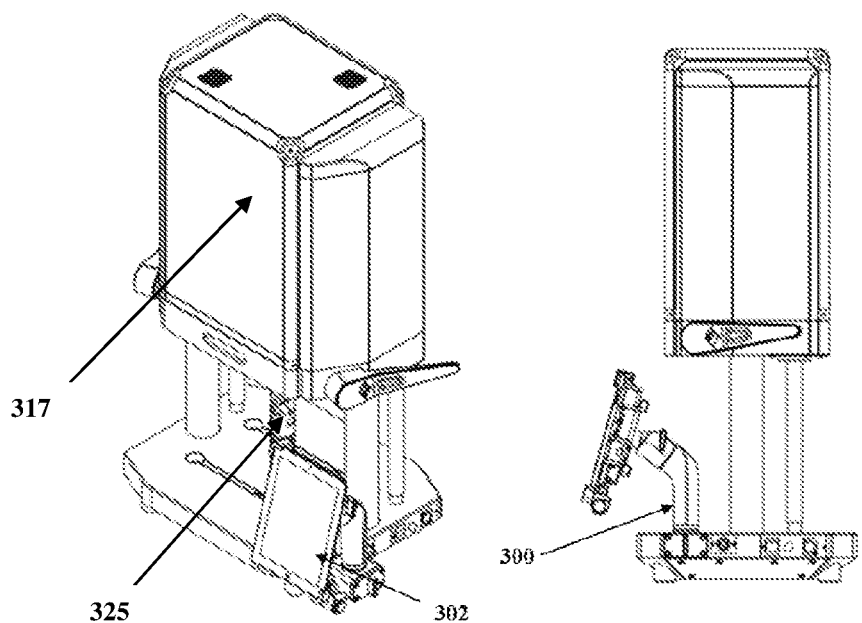
FIG. 8 illustrates isometric view and side view of a servo controlled low force test system using the smartphone/tablet holder as shown in FIG. 3 in accordance to an embodiment herein.

FIG. 8 illustrates an isometric view and a side view of a servo controlled low force test system using the smartphone/tablet holder 300. FIG. 8 shows a low force servo controlled test system integrated with such tablet holder (present invention) for carrying material tests like tensile, compression, fatigue and fracture tests using tablet as a test console.

The principle of operation of the smartphone/tablet holder 300 involves the following steps:

Step 1: Mounting the tablet holder bracket (part no. 308 in FIG. 3) in the slot provided on the test system as shown in FIG. 8, Step 2: Inserting the vertical tube (part no. 306 FIG. 3) in the mounting bracket as shown in FIG. 8, Step 3: Adjusting the vertical height of the vertical tube by using the scale engraved on it (FIG. 7), Step 4: Adjusting angular position of the vertical top end (vertical tube) connecting to the tablet gripper by rotating it about the vertical axis (FIG. 7), Step 5: Locking the vertical tube by rotating the knob (part no. 310 in FIG. 3) on tablet holder bracket (FIG. 7), Step 6: Connecting the vertical tube and tablet gripper via swivel joint that facilitates 3 degrees of freedom angular positioning of the tablet gripper (FIG. 7), Step 7: Locking the orientation of the tablet gripper by rotating the knob (part no. 314 in FIG. 3) provided on the top end of the vertical tube (FIG. 7), Step 8: Placing the tablet by adjusting the swivel corners of the tablet gripper to accommodate the tablet of given size, Step 9: Locking the swivel corners of the tablet gripper by turning the knobs (part no. 312 in FIG. 3), Step 10: Passing the USB cable for tablet charger and cabling for E-stop and or any other important hardwired button such as RESET, ON/OFF, jog-wheel arrangement etc. pass through internal concealed cabling passage respectively as shown in FIGS. 5 & 6.

The tablet, for machine control, mounted on such a tablet holder facilitates the operator to carry out, with ease, all the testing operations mentioned in the introduction.

The present invention provides the following features: (a) Internal passage for fully concealed cabling. (b) Swivel corners to match diagonal edges of smart tablets of variable size ranging from 8"-12". (c) Built-in E-Stop and/or other button/switch with concealed wiring. (d) Concealed cabling for any other important hardwired button such as RESET, ON/OFF, etc. (e) Integral sheet holder to facilitate hands-free operator activities. (f) Ability to lock the position in any axial directions and angular orientations. (g) Cable entry through mounting bracket for fully concealed cable housing. (h) Internal cavities to suit passage of all industry standards cabling of USB/Ethernet/Power supply. (i) Component sizing to suite manufacturer from metals/thermoplastics without the change of design dimensions. (h) The jog-wheel arrangement (rotary encoder and its electronic hardware) along with its concealed wiring. This jog-wheel is thumb operated to facilitate actuator or cross-head movement simultaneously along with other operations on the system through fore finger movement over the touch screen of smartphone/tablet.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specifications and drawings are to be regarded in an illustrative sense rather than a restrictive sense. The scope of the invention should, therefore, be determined with reference to the appended claims, along with the full scope of equivalents to which such claims are entitled.

We claim:

1. A device for holding an electronic gadget, comprising:
 a gadget holder mounting bracket;
 a height adjustable tube;
 a height adjustable lock, wherein bottom end of height adjustable tube is secured at the gadget holder mounting bracket and top end of the height adjustable tube comprises a gadget rotational lock;
 a gadget gripper secured to a clamp connected to a top end of the height adjustable tube and comprising swivel corners configured to hold diagonal ends of the electronic gadget; and
 a jog-wheel configured to control an actuator movement or a cross-head movement to open or close the gadget gripper and to vary the distance between the swivel corners;
 wherein the gadget gripper comprises a rotary encoder and related electronic hardware configured to facilitate the actuator movement or the cross-head movement based on input to the jog-wheel;
 wherein the device is configured to conceal one or more wires coupled to one or more of the jog-wheel, the rotary encoder, or the electronic gadget, by routing the one or more wires internally to at least one component of the device.

* * * * *